United States Patent [19]

Simon, Jr. et al.

[11] Patent Number: 4,848,189
[45] Date of Patent: Jul. 18, 1989

[54] ENGINE THROTTLE STOP CONTROL SYSTEM

[75] Inventors: Robert C. Simon, Jr., Novi, Mich.; Daniel B. O'Connell, Rochester, N.Y.; David C. Poirier, Troy, Mich.; John A. Calkins, Ann Arbor, Mich.; Richard A. Marsh; Peter M. Medich, both of Birmingham, Mich.; Richard C. Mamolen, Brighton, Mich.

[73] Assignee: General Motors Corporation, Detroit, Mich.

[21] Appl. No.: 223,354

[22] Filed: Jul. 25, 1988

[51] Int. Cl.4 .............................................. B60K 41/08
[52] U.S. Cl. ........................................ 74/872; 74/878; 123/342
[58] Field of Search ...................... 74/872, 873, 878; 123/396, 350, 340, 342

[56] References Cited

U.S. PATENT DOCUMENTS

| Re. 25,793 | 6/1965 | Maurer et al. | 123/396 X |
|---|---|---|---|
| 3,643,526 | 2/1972 | Thornburgh | 74/873 X |
| 3,691,873 | 9/1972 | Lombard et al. | 74/873 X |
| 3,704,382 | 11/1972 | Huntzinger | 307/233 |
| 3,707,892 | 1/1973 | Kuroda et al. | 74/873 |
| 3,756,208 | 9/1973 | Toda et al. | 74/872 X |
| 4,205,639 | 6/1980 | Kawase et al. | 123/396 X |
| 4,237,833 | 12/1980 | DesLauriers | 123/320 |
| 4,290,323 | 9/1981 | Gospodar | 74/872 X |
| 4,355,550 | 10/1982 | Will et al. | 74/782 |
| 4,383,506 | 5/1983 | Atago et al. | 123/179 G |
| 4,391,246 | 7/1983 | Kawabata et al. | 123/340 X |
| 4,474,083 | 10/1984 | Braun | 123/342 X |
| 4,510,901 | 4/1985 | Yatabe et al. | 123/340 X |
| 4,538,579 | 9/1985 | Moriya et al. | 123/340 X |
| 4,760,825 | 8/1988 | Morita | 123/340 |

Primary Examiner—Dwight G. Diehl
Assistant Examiner—Christopher C. Campbell
Attorney, Agent, or Firm—Howard N. Conkey

[57] ABSTRACT

A throttle follower controller for establishing a release throttle position upon the release of the throttle by the vehicle operator which is maintained at a specified value for a predetermined time if the vehicle transmission is experiencing an upshift or if an upshift will occur upon the release of the throttle to provide for a smooth upshift. Upon completion of the upshift or if no upshift will occur upon release of the throttle, a controlled transition of the throttle angle to a predetermined lower coastdown value is established to prevent drive-on while preventing a sudden harsh drive line jerk upon release of the vehicle throttle.

11 Claims, 11 Drawing Sheets

ENGINE THROTTLE STOP CONTROL SYSTEM

BACKGROUND OF THE INVENTION

This invention relates to a throttle stop controller for an automotive vehicle internal combustion engine and more particularly to the control of the throttle stop position to provide for smooth vehicle transmission upshifts when the throttle is released and to provide a smooth transition between power and coastdown operating modes of the vehicle.

It is well known in automotive engine controls to regulate the released (typically referred to as closed) position of the throttle in the throttle bore of the engine such as by controlling the position of a movable throttle stop in order to achieve a desired engine operating condition. The most common function of such regulation is the closed loop control of engine idle speed. When controlling the engine idle speed, the throttle position and therefore air intake quantity is actively regulated in response to measured engine speed to maintain a scheduled engine idle speed.

The need for a controlled transition to the idle speed control mode when the vehicle operator releases the throttle has long been recognized. For example, to prevent the engine speed from undershooting the idle speed, thereby giving rise to potential engine stalling, or to prevent the increase in hydrocarbon emissions resulting from a deficiency of air, it has been suggested that the released throttle position be established at some controlled transitional throttle angle.

One such known system for accomplishing this transitional control provides for extending the throttle stop corresponding to a predetermined small throttle angle such as 1.5 degrees each time the throttle is opened by the vehicle operator. When the throttle is released and engages the throttle stop, the throttle is held at the opened position established by the throttle stop for a predetermined constant time period after which the throttle angle during vehicle coastdown is controlled to a predetermined coastdown schedule. The coast don throttle angle control is continued until the vehicle speed becomes lower than an idle speed reference after which the idle speed control operating mode is enabled to control engine idle speed. The initial throttle angle represented by the throttle stop that is established when throttle is opened may typically be a function of coolant temperature, air conditioner clutch state and an altitude factor. The angle of the throttle established during the coastdown period while the vehicle speed is above the idle speed reference is typically a function of the engine temperature or vehicle speed.

An observation has been made in regard to the effect of the release of the throttle to the position established by the throttle stop including the position established by the known transitional controls set forth above. When the throttle is released by the vehicle operator while the vehicle transmission is experiencing an upshift or an upshift occurs in response to conditions resulting from the release of the throttle, the upshift may produce a sudden jerk of the vehicle resulting in poor vehicle ride quality. While this harsh let-up (released throttle) upshift may occur even when the automatic transmission converter clutch is deenergized during the shift, the upshift may be particularly severe in transmissions in which the converter clutch is energized to couple the input and output of the torque converter.

Even without a transmission upshift occurring on release of the throttle, let-up driveline lashing or bumping has been observed particularly if the transmission torque converter clutch is maintained energized or if the throttle was released from an engine accelerating condition to the coastdown throttle angle.

While the prior transitional throttle controls operate to prevent engine stalling and improve the emissions during the transition to the idle speed control mode of the engine, the controls are ineffective to alleviate the harsh upshift or driveline jerk that may result upon the release of the throttle.

SUMMARY OF THE INVENTION

This invention provides for controlling the throttle position when the throttle is released by the vehicle operator so as to provide for smooth transmission upshifts and a smooth transition to the engine coastdown operation.

In general, the subject invention provides for monitoring the throttle position and providing a throttle follower function in which the throttle stop controlling the released position of the throttle is moved to a position determined to provide for a smooth transmission upshift and to prevent driveline jerk in the event the throttle is released. When the vehicle operator releases the throttle, the throttle position established by the throttle stop is held for a period approximately equal to the duration of an upshift if an upshift occurs at the release of the throttle. Following the time period over which the transmission upshift occurred or immediately upon the release of the throttle if an upshift will not occur, the throttle stop is retracted in a controlled manner to a position establishing a desired coastdown throttle angle. The coastdown throttle angle may be determined by the previous transitional controllers which function to complete the transition to the idle speed control mode.

Figure 1:
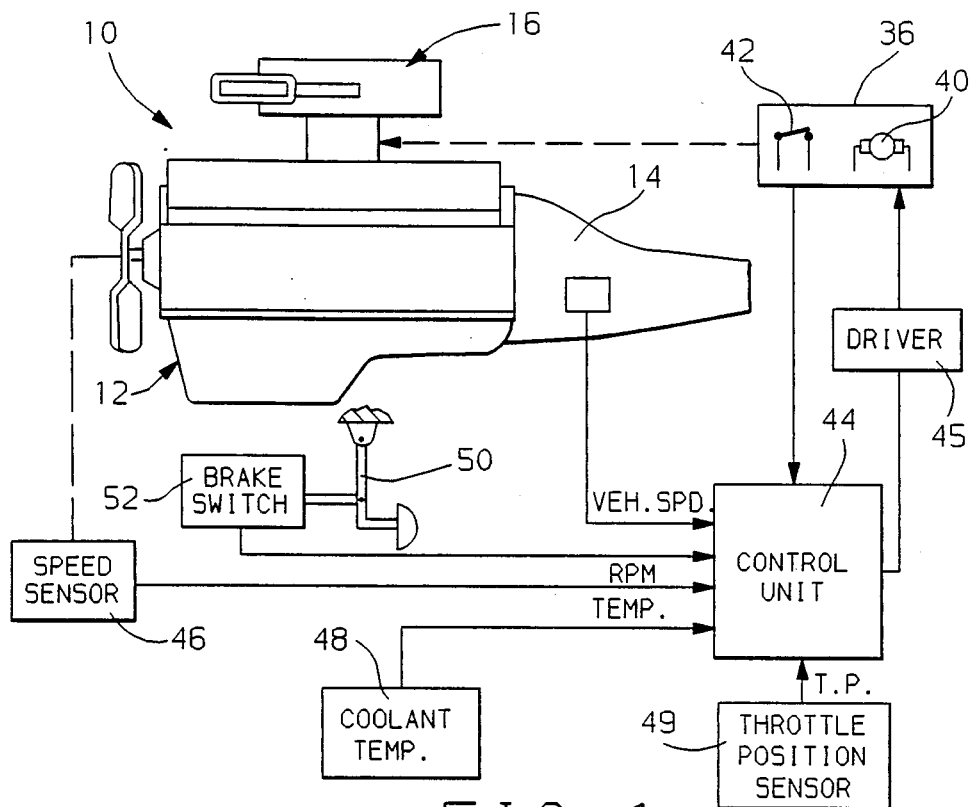
FIG. 1 is a schematic and block diagram of a motor vehicle engine and a control system including a computer based control unit for carrying out the control function of this invention.

Referring to the drawings, and more particularly to FIG. 1, reference numeral 10 generally designates a motor vehicle drive train including an internal combustion engine 12 and an automatic transmission 14. The engine includes a crankshaft whose output drives the transmission 14 the output of which drives the vehicle wheels (not shown). The engine 12 is supplied with an air-fuel delivery system 16 of the type wherein a throttle in an induction passage controls the flow of air therethrough and additional apparatus supplies fuel sufficient to achieve a desired air/fuel ratio of the mixture drawn into the engine 12 for combustion.

Figure 2:
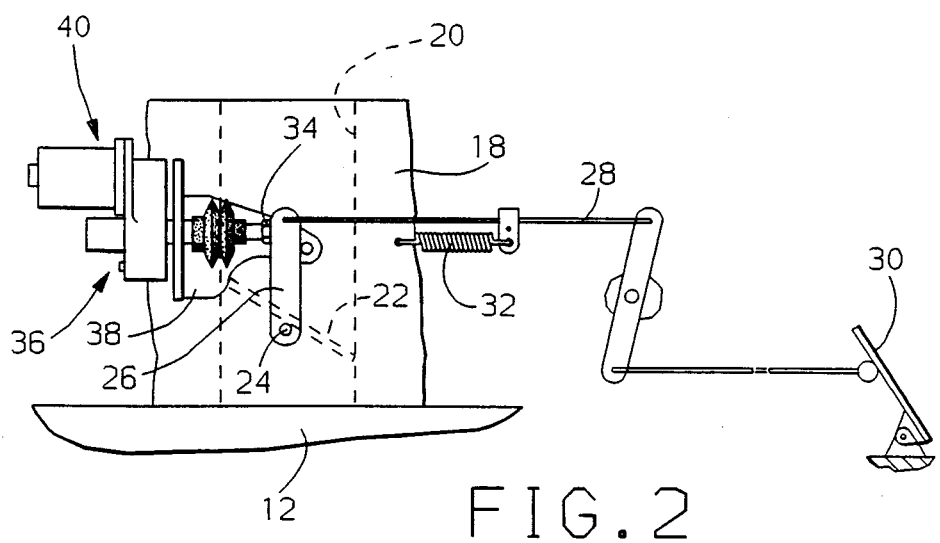
FIG. 2 an elevational view of a throttle stop control device utilized in the control system of FIG. 1.

The air flow control apparatus is more specifically illustrated in FIG. 2. As seen in this FIGURE, the engine 12, of which only a top portion is shown, includes a throttle body 18 with a throttle bore 20 in which a throttle valve 22 is pivotally mounted by a shaft 24. The throttle valve shaft 24 has a lever 26 fixed thereto which is operably connected by linkage 28 to an accelerator pedal 30 located in the vehicle's passenger compartment. The throttle valve 22 is normally opened by the vehicle operator depressing the accelerator pedal 30. When the operator releases control of the throttle valve 22, the throttle lever 26 is returned and held by a return spring 32 against a throttle stop 34 on a throttle stop positioner 36 which is mounted by a bracket 38 on the throttle body 18. The throttle stop positioner 36 is controlled to adjust the position of the throttle stop 34 thereby controlling the minimum open position of the throttle valve 22 and thus the engine's idle speed when the operator releases the accelerator pedal 30. As will be described, the throttle stop positioner 36 is also controlled to establish the position of the throttle stop 34 for controlling the transition to the idle speed control mode of the engine 12 when the throttle 22 is released by the vehicle operator.

The throttle stop positioner 36 includes a direct current permanent magnet motor 40 whose output shaft is coupled to a gear train such that upon rotation of the motor output shaft, the throttle stop 34 is caused to extend or retract depending upon direction of rotation of the output shaft of the motor 40. By selective operation of the motor 40, the position of the stop 34 is controlled to define the released position of the throttle valve 22 in the throttle bore 20. The throttle stop positioner 36 also includes a throttle stop switch 42 (schematically illustrated in FIG. 1) that is closed by a slight movement of the throttle stop 34 when engaged by the throttle lever 26. The closed switch then indicates a released throttle condition. The specific form of the throttle stop positioner 36 including the switch 42 operated upon release of the throttle valve 22 may take any desired form including by way of example the form as illustrated in the U.S. Pat. No. 4,212,272 which issued on July 15, 1980 and which is assigned to the assignee of this invention.

Returning to FIG. 1, a control unit 44 responds to various input signals and controls the DC motor 40 for establishing a desired engine idle speed and for establishing the transition to the idle speed control mode upon release of the vehicle throttle by the vehicle operator. The transitional control includes the throttle follower control of this invention and may further include a coastdown control mode for controlling the throttle stop upon termination of the throttle follower control and until the vehicle speed decreases to an idle speed. The DC motor 40 is controlled by the control unit 44 via a driver circuit 45 to establish the desired position of the throttle stop 34. The driver circuit 45 may take the form of a conventional H-switch that is responsive to a signal representing a commanded direction of the motor 40 and a control signal for driving the motor in the specified direction.

To establish the desired position of the throttle stop 34, input signals indicative of various operating parameters are supplied to the control unit 44. One such signal is a signal representing vehicle speed provided by a speed transducer in the transmission 14. Alternatively, a wheel speed signal may be utilized. Engine speed is provided by a speed sensor 46 which may be any appropriate sensor of the type adapted to generate a signal indicative of the rotational speed of the crankshaft. Examples of such a sensor are an electromagnetic pickup adjacent the toothed flywheel of the engine 12 coupled to an input counter of the control unit 44 or the reference pulse output of a spark control circuit providing a reference pulse at predetermined engine rotational increments. The control unit 44 also receives analog signals from an engine coolant temperature sensor 48 and a throttle position signal from a position sensor 49 such as a throttle driven potentiometer.

The vehicle powered by the engine 12 includes an operator actuated braking system having a standard brake pedal 50 which, when operated to actuate the brakes, further actuates a brake switch 52 of the type normally used to cause the lighting of the brake lights. The brake switch 52 therefore generates an output indicative of the brakes being applied, which signal is applied to the control unit 44. Similarly, the output of the throttle stop switch 42 in the throttle stop positioner is provided to the control unit 44 to provide a signal indicative of a released or non-released condition of the throttle blade 22.

Figure 3:
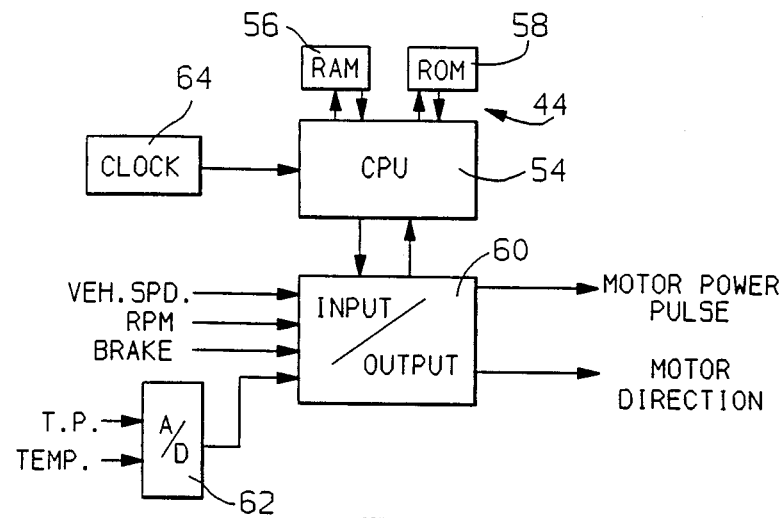
FIG. 3 illustrates a vehicle mounted computer which is a preferred form of the control unit of FIG. 1.

In its preferred form, the control unit 44 is computer based and may take the form of any well known digital computer based controller. FIG. 3 illustrates one possible form of the control unit 44. The control unit basically comprises a central processing unit (CPU) 54 which interfaces in the normal manner with a random access memory (RAM) 56, a read only memory (ROM) 58, an input/output unit (I/O) 60, an analog-to-digital converter (A/D) 62, and a clock 64.

In general, the CPU 54 executes an operating program permanently stored in the ROM 58 which also contains constants and values stored such as in lookup tables addressed in accord with the values of selected parameters. Data is temporarily stored and retrieved from various ROM designated address locations in the RAM 56. The output of the speed sensor 46, the brake switch 52 and the vehicle speed signal from the transmission 14 are supplied to the input/output circuit 60. The analog signal from the coolant temperature sensor 48 the throttle position sensor 49 are processed by the A/D 62, the output of which is provided to the input/output circuit 60.

The input/output circuit 60 provides for a discrete output to the motor driver 45 to establish the direction of operation of the DC motor 40 and a pulse output to the motor driver 45 to cause the DC motor 40 to position the throttle stop 34. While the input/output circuit 60 may take any known form, the circuit may provide a controlled pulse output by initiating the pulse and inserting into a register a number representing a point in time as measured by a free running counter clocked by the clock 64 for terminating the pulse. When the free-running counter becomes equal to the count in the register, the pulse is terminated.

The throttle follower function of this invention extends the throttle stop 34 outward as the actual throttle angle is increased by the vehicle operator by operation of the pedal 30 to provide a high momentary initial throttle angle when the throttle blade is released by the vehicle operator. This higher initial throttle angle provides for significant benefits in the quality of an upshift in the automatic transmission that may occur upon the release of the throttle and further provides for an improvement in the letup feel even if the transmission does not upshift during or following the letup. The latter improvement is provided by eliminating the letup jerk associated with the sudden release of the vehicle throttle through a controlled transition to the coastdown throttle stop operating mode.

Figure 4A:
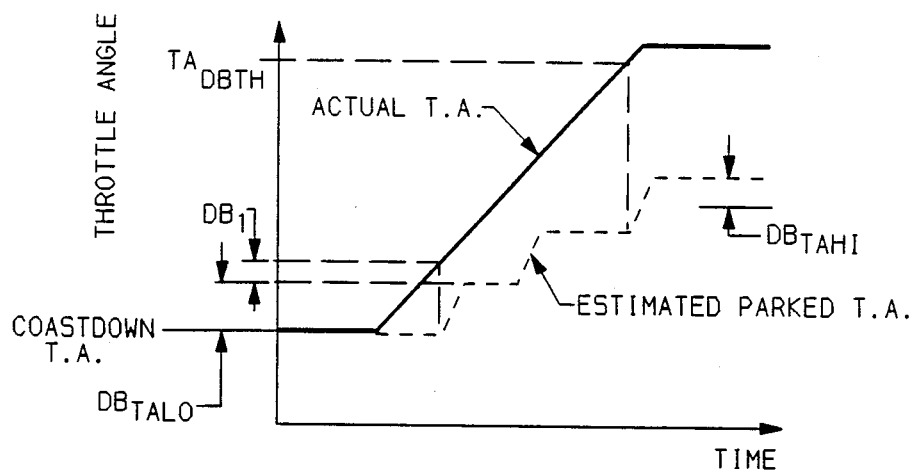
FIGS. 4a and 4b are diagrams illustrating the throttle follower extend and retract operations in accord with the principles of this invention.

The extend operation of the throttle stop 34 in the throttle follower function of this invention as the operator opens the throttle valve 22 is depicted in the diagram of FIG. 4a. The throttle stop is extended to a position representing a desired parked throttle angle (the throttle angle as limited by the stop 34 when the throttle is released by the vehicle operator) if the throttle switch 42 is open and the desired parked throttle angle is greater than an estimation of the current parked throttle angle by a predetermined deadband. The deadband is equal to $DB_{TALO}$ at throttle angles less than a threshold $TA_{DBTH}$ and equal to $DB_{TAHI}$ at throttle angles greater than $TA_{DBTH}$. This deadband insures that a pulse for extending the throttle stop 34 is not computed or issued which would cause the motor 40 to extend the throttle stop too close to the actual throttle angle. The deadband also insures that any throttle movement attempted is sufficiently large to achieve a reasonably accurate estimate of the position of the throttle stop 34. The smaller deadband $DB_{TAHI}$ is provided at higher actual throttle angles to allow smaller than usual extend pulses to be issued to the motor 40 which aids in achieving the desired final position of the throttle stop 34 more accurately.

The desired parked throttle angle position of the throttle stop 34 is computed as an offset from a predetermined throttle angle which, in this embodiment, is the computed coastdown throttle angle established by a conventional coastdown throttle control routine providing transitional control to the closed loop idle speed control operating mode of engine 12 upon termination of the throttle follower function of this invention. The throttle angle offset value is determined as a function of the actual throttle angle and is limited as a function of various parameters as will be described. The resulting parked throttle angle is then limited to the actual throttle angle less a deadband value $DB_1$ which prevents the throttle stop 34 from being moved too close and perhaps striking the throttle lever 26.

Since there is no provision for the measurement of the throttle angle represented by the position of the throttle stop 34 when the throttle lever 26 is out of contact with the throttle stop 34, the parked throttle angle represented by the throttle stop position is continually estimated based upon the time the DC motor 40 is energized corrected for various factors including coolant temperature. This estimated parked throttle angle is controlled to the desired parked throttle angle as computed.

Figure 4B:
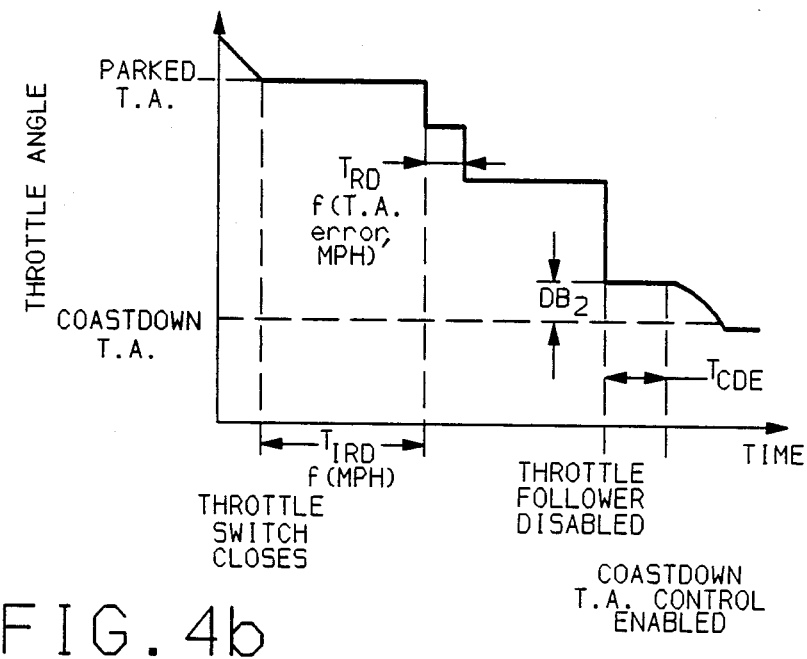

The retract operation of the throttle stop 34 in the throttle follower function of this invention is illustrated in FIG. 4b. This operation is initiated when the control unit 44 senses closure of the switch 42 when the throttle blade 22 is released by the vehicle operator. After the throttle blade 22 is released to the position as limited by the throttle stop 34, the throttle stop 34 is maintained at the previously established parked throttle angle for a predetermined time period $T_{IRD}$ if the transmission is experiencing an upshift or if an upshift will occur. By maintaining the throttle angle at this high value for the period of the transmission shift, a significant improvement of the upshift quality results thereby improving the ride quality of the vehicle.

If the conditions do not exist for an upshift or after the time period $T_{IRD}$ has expired, the throttle stop 34 is retracted in a controlled manner by issuing a number of retract pulses to the motor 40 to allow the throttle to close to a predetermined angle such as the desired coastdown throttle angle previously referred to. In the preferred form, the retraction of the throttle stop 34 is made in the form of an exponential decay toward the coastdown throttle angle to provide for a smooth transition from the throttle follower parked throttle angle to the coastdown throttle angle. This is accomplished by imposing a delay $T_{RD}$ between retracts of the throttle stop as a function of (1) the difference between the actual throttle angle and the desired coastdown throttle angle and (2) vehicle speed. Even though the conditions for an upshift are not present upon the release of the throttle, the established parked throttle angle and the controlled throttle closure therefrom prevent letup jerk resulting from driveline lash while avoiding unnecessary drive-on of the engine, resulting in an improvement in the ride quality in the transition to the initial coastdown throttle angle.

The throttle follower function is disabled when the throttle angle is within a deadband value $DB_2$ of the initial coastdown throttle angle. The coastdown throttle control routine which is not a part of this invention is then enabled after a time delay $T_{CDE}$.

The throttle follower control routine executed by the control unit 44 in controlling the throttle stop 34 in accord with this invention is illustrated in the FIGS. 5 and 6a through 6h. While other intervals may be established, the throttle follower routine is executed each 12.5 milliseconds.

Figure 5:
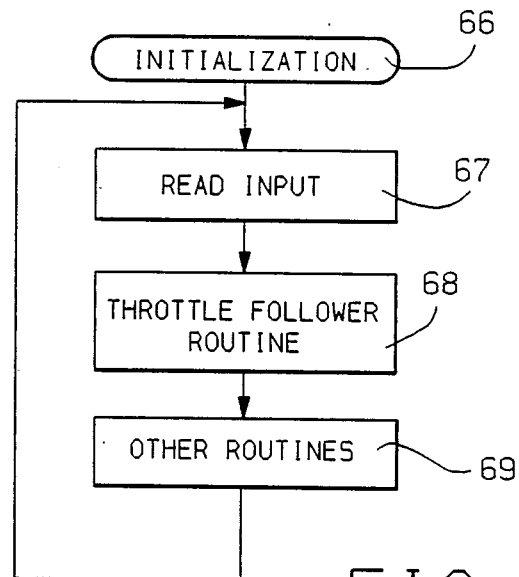
FIGS. 5 and 6a through 6h are flow diagram representative of the computer program instructions executed by the control unit of FIG. 1 in carrying out the throttle follower function of this invention.

FIG. 5 illustrates an executive, or main loop program. The step 66 represents a series of instructions executed at the initiation of each period of vehicle operation for initializing the various registers, timers, etc., of the control unit 44 prior to the commencement of various control functions including the throttle follower control function of this invention. The instructions represented by the step 67 cause the control unit 44 to read the various input signals described in reference to FIG. 1. The instructions represented by the step 68 direct the execution of the throttle follower routine of this invention and the instructions represented by the step 69 direct the execution of other routines for control of the drive train 10. The routines of step 69 may include, for example, an idle speed control routine for controlling the throttle stop 34 to maintain a desired idle speed during vehicle idle conditions and a coastdown throttle control routine for controlling the throttle stop 34 during the vehicle coastdown to idle. Other routines such as for controlling fuel, spark timing and transmission gear may also be executed at step 69. The control functions defined by the steps 67 through 69 are sequentially and repeatedly executed at predetermined intervals such as 12.5 millisecond intervals.

Figure 6A:
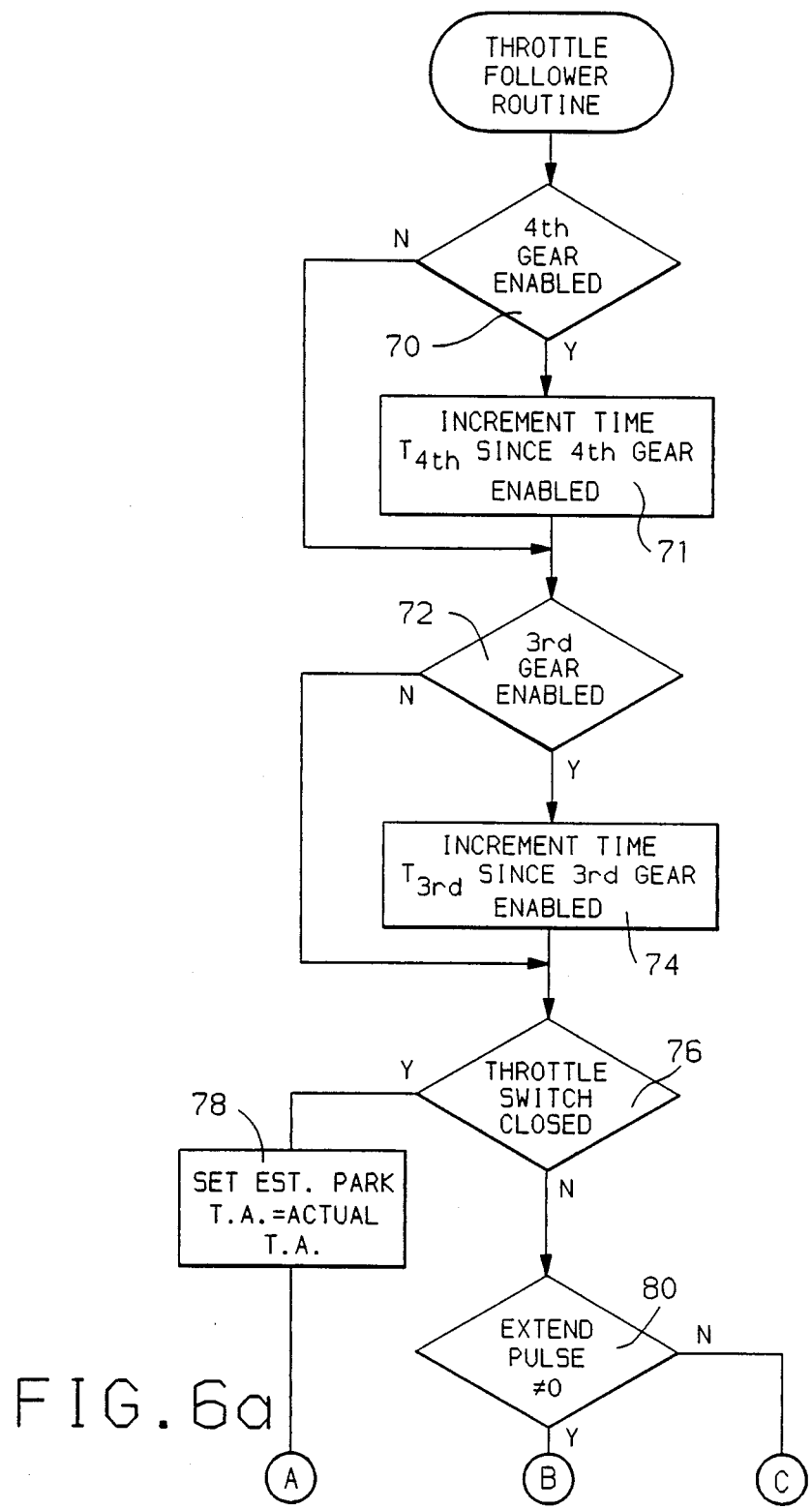
Figure 6B:
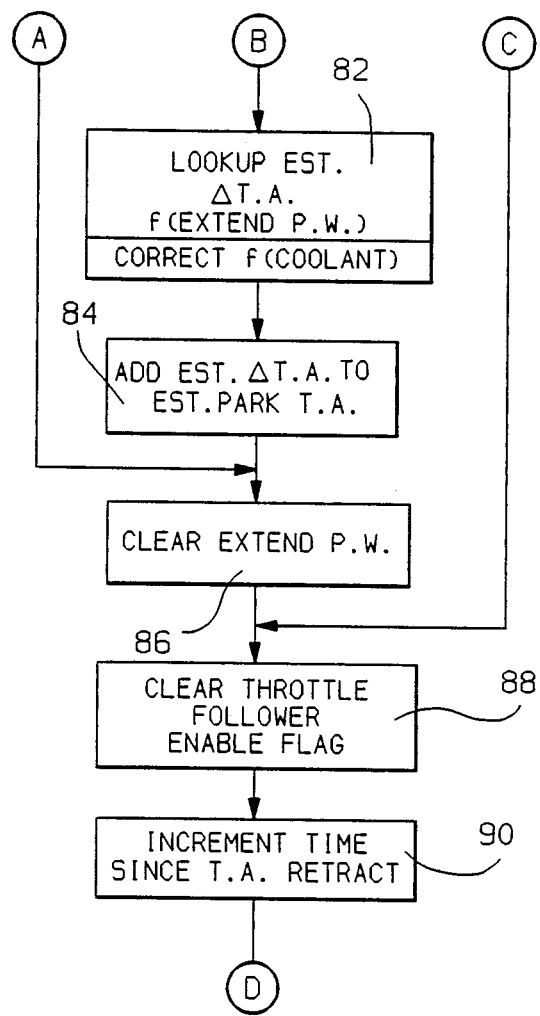
Figure 6C:
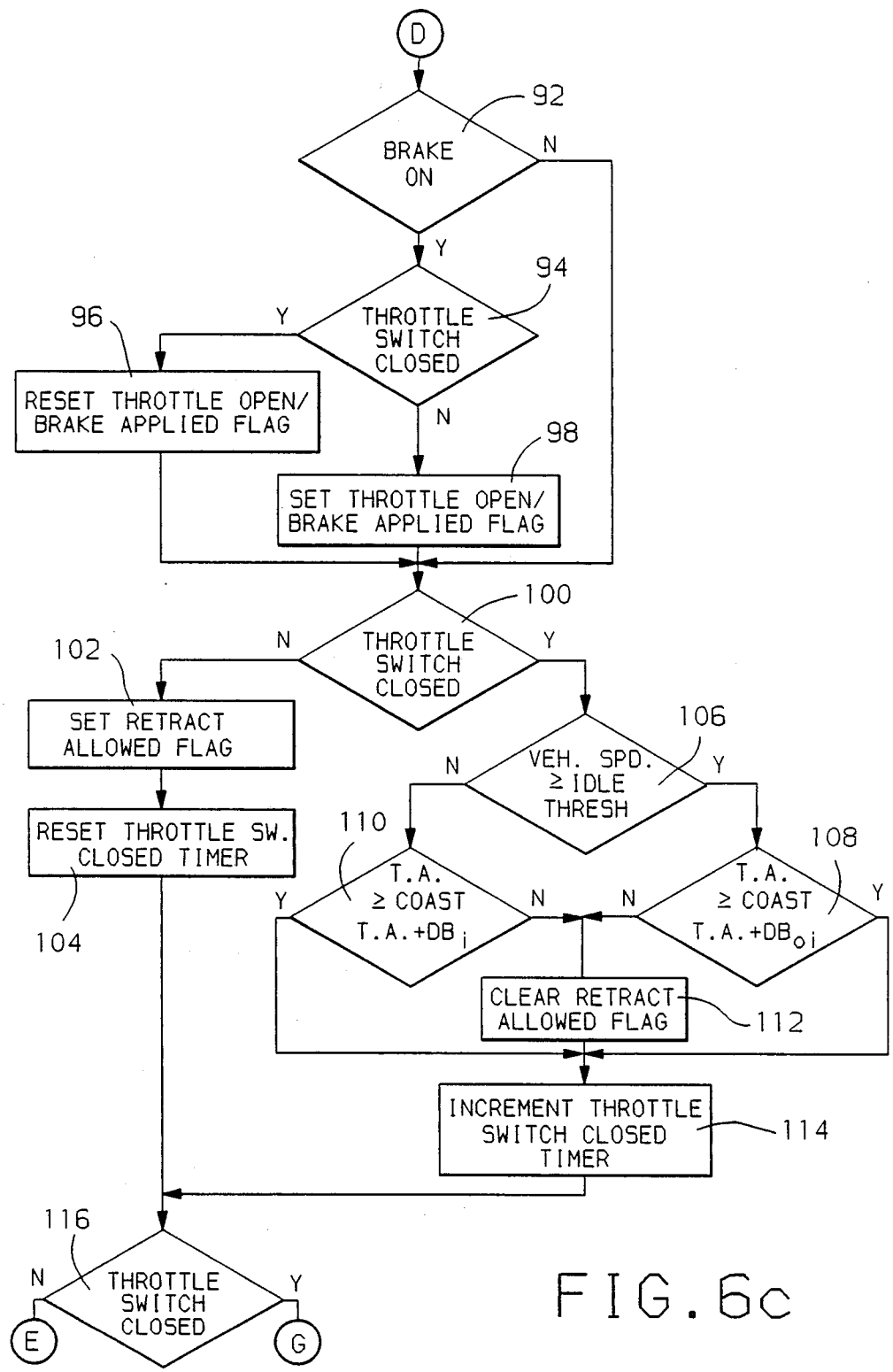

The throttle follower routine of step 68 is more specifically illustrated in the FIGS. 6a through 6h. Referring first to FIGS. 6a, 6b and 6c, the routine first executes instructions represented by the steps 70, 71, 72 and 74 which function to measure the time since either the third or fourth gear was enabled thereby initiating an upshift to either third or fourth gear. These steps assume that the automatic transmission 14 is controlled by the control unit 44 or the control unit 44 has access to such enabling information so that the time from the initiation of the upshift can be determined. Specifically, step 70 determines whether or not the fourth gear is enabled and if so, step 71 increments the time $T_{4th}$ representing the elapsed time since the fourth gear was enabled. Similarly, if the step 72 detects that the third gear was enabled, step 74 increments the time $T_{3rd}$ representing the elapsed time since the third gear was enabled. As will be described, the time increments $T_{3rd}$ and $T_{4th}$ will be utilized to determine if a second to third or third to fourth upshift has been completed.

The instructions represented by the steps 76 through 84 function to provide an estimate of the parked throttle angle represented by the position of the throttle stop 34. This angle represents the estimate of the angle of the throttle when the throttle lever 26 next engages the throttle stop 34.

The estimated throttle angle is initialized to the actual throttle angle when the throttle switch 42 is closed (as sensed by step 76) prior to the operator opening the throttle blade by the step 78. As will be described, when the vehicle operator thereafter opens the throttle blade 22, the throttle follower routine periodically computes and issues extend pulses to the DC motor 40 for extending the throttle stop 34, the extend pulses having durations determined to establish the desired parked throttle angle.

As the throttle stop is extended after the throttle is opened by the vehicle operator in response to the extend pulses, the steps 80 through 84 function to estimate the parked throttle angle resulting from such extensions. This estimation of the parked throttle angle is obtained by estimating the change in throttle angle corresponding to the movement of the throttle stop 34 by the motor 40 in response to each computed extend pulse duration and summing the estimated changes in the throttle angle to the estimated parked throttle angle initialized to the actual throttle angle at step 78.

Step 80 first determines whether or not an extend pulse duration was computed during the prior execution of the throttle follower routine to establish a desired parked throttle angle. If a new extend pulse requirement was not computed, the previously estimated parked throttle angle is still valid and the steps for estimating a new parked throttle angle are bypassed. However, if step 80 determines that an extend pulse was computed in order to establish a desired parked throttle angle, step 82 determines the amount that the throttle stop will be moved by the application of an extend pulse to the motor 40 having the computed duration.

The uncompensated change in the throttle angle corresponding to the movement of the throttle stop 34 by the DC motor 40 in response to an extend pulse of the computed duration is obtained from a ROM lookup table as a function of the computed duration of the extend pulse. The values stored in the lookup table are predetermined values based on the motor characteristics. The value retrieved from the lookup table corresponding to the computed extend pulse duration is then compensated as a function of the engine coolant temperature read and stored at step 67, the motor 40 having temperature dependent operating characteristics. Accordingly, the result of step 82 is a throttle angle change corresponding to the movement of the throttle stop by the motor 40 in response to an extend pulse having the computed duration for establishing the desired parked throttle angle.

Having determined the incremental change in the throttle angle resulting from the determined extend pulse width, the estimated parked throttle angle following application of the extend pulse width to the motor 40 is obtained by adding this change at step 84 to the previously estimated parked throttle angle.

Once the estimated parked throttle angle takes into account the last computed extend pulse duration, the computed value is cleared at step 86. It should be noted, however, that this does not operate to terminate a pulse that is being issued to the DC motor 40 based on the computed pulse duration but only clears the value used for the estimation of the parked throttle angle.

The routine next clears a throttle follower enable flag at step 88 to disable the throttle follower routine. This flag will subsequently be set if the conditions for continued operation of the throttle follower routine are met. At step 90, a register providing a measure of the time since the last throttle angle retract was executed is incremented. This time will be used in establishing the delay $T_{RD}$ between retractions of the throttle stop 34 previously described in regard to FIG. 4b to provide a controlled feathering down of the throttle angle when the operator releases the throttle blade 22 to the throttle stop.

The instructions of steps 92 through 98 determine if the condition of an open throttle stop switch 42 while the wheel brakes are applied exists. This condition represents a potential problem such as a faulty throttle stop switch 42 and when sensed will be used in a subsequent program step to limit the computed throttle angle offset value. The step 92 determines if the wheel brakes are applied. If the brakes are applied, the program proceeds to step 94 where the state of the throttle stop switch 42 is sensed. If the switch is closed representing a normal condition when the wheel brakes are applied, step 96 resets a throttle open/brake applied flag. However, if the throttle switch 42 is open representing an abnormal condition, step 98 is executed where the throttle open/brake applied flag is set. The program steps 94, 96 and 98 are bypassed if step 92 determines the brakes are not applied.

Retraction of the throttle stop 34 from the parked throttle angle position will be enabled when the throttle switch 42 is opened and thereafter disabled when the throttle angle comes within the deadband angle $DB_2$ (illustrated in FIG. 4b) of the predetermined coastdown throttle angle when the throttle switch 42 is closed. The instructions represented by the next series of steps provide for enabling or disabling of the retraction of the throttle stop 34. These instructions begin at a step 100 where the condition of the throttle switch 42 is sampled. If the throttle switch is open, throttle retracts are enabled by resetting a retract allowed flag at step 102. Thereafter at step 104, a throttle switch closed timer is reset. This timer is used to time the period since the throttle switch was last closed, the time being used in the establishment of the initial delay $T_{IRD}$ illustrated in FIG. 4b before a retract is allowed after the throttle is released by the vehicle operator. As previously indicated, this time delay is established when the conditions indicate an upshift condition in the automatic transmission upon release of the throttle by the vehicle operator.

As indicated, when the throttle switch is closed, retraction of the throttle stop 34 via the throttle follower routine will be permitted only when the throttle angle is above the deadband $DB_2$ of the predetermined coastdown throttle angle. While the value of the deadband $DB_2$ may be a constant in one embodiment, in the preferred embodiment, the value of $DB_2$ is set equal to a value $DB_i$ when the vehicle speed is less than an idle speed threshold and set equal to a value $DB_{of}$ that is less than $DB_i$ when the vehicle speed is equal to or greater than the idle speed threshold. The instructions represented by steps 106, 108 and 110 determine if the throttle angle is within the respective deadbands as a function of the vehicle speed relative to the idle speed threshold. If the throttle angle is within the respective deadband, a step 112 clears the retract allowed flag to prevent further retraction of the throttle stop 34 by the throttle follower routine. If the throttle angle is outside of the respective deadbands, the step 112 is bypassed.

As previously indicated relative to step 104, a throttle switch closed timer is utilized to provide a time for establishing the time delay $T_{IRD}$ before throttle retracts are allowed after the throttle is released by the vehicle operator and when an upshift in the automatic transmission occurs at the release. A step 114 increments this time each time the throttle follower routine is executed following closure of the throttle stop switch 34 as sensed by the step 100.

The next step 116 samples the condition of the throttle stop switch 42 to select between an extend routine to establish a desired parked throttle angle and a retract routine to retract the throttle stop 34 from the parked throttle angle position. If the throttle stop switch 42 is opened, the routine for extending the throttle stop 34 to establish the desired park throttle angle is executed and if the throttle stop switch 42 is closed, the routine for retracting the throttle stop 34 is executed to provide controlled closure of the throttle valve 22 to the predetermined coastdown throttle angle.

Figure 6D:
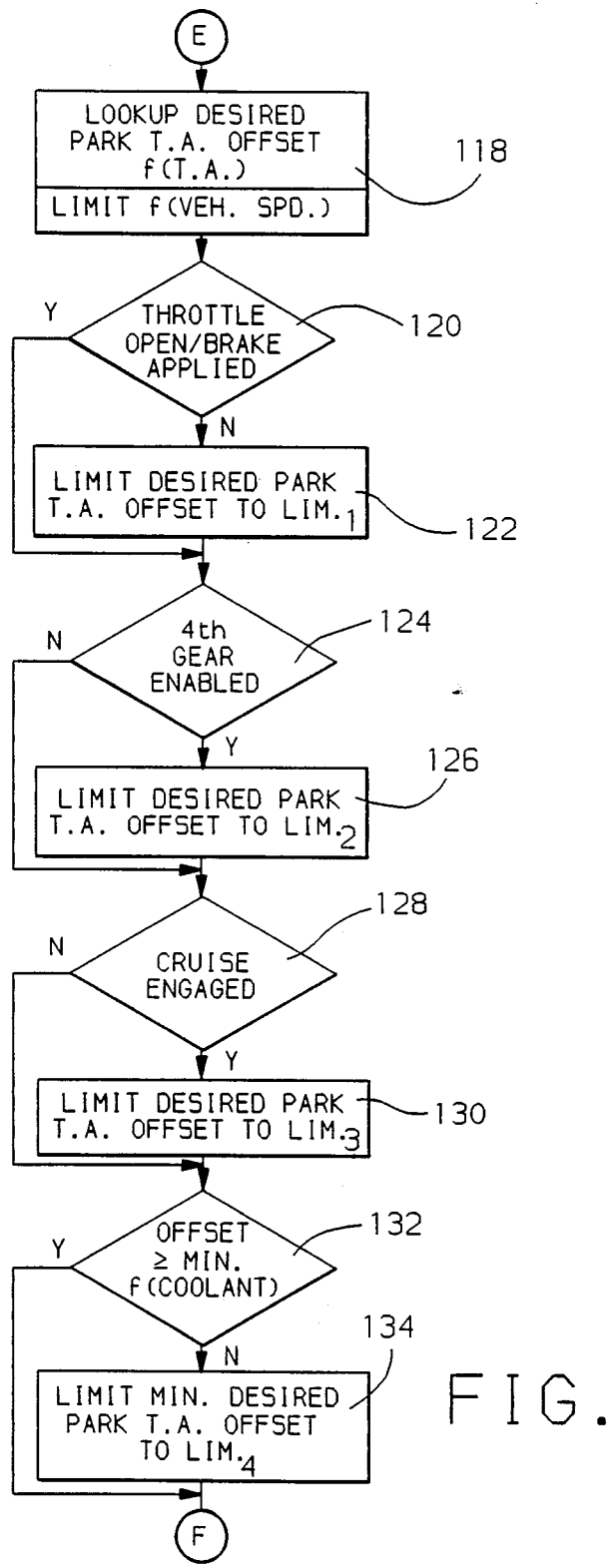
Figure 6E:
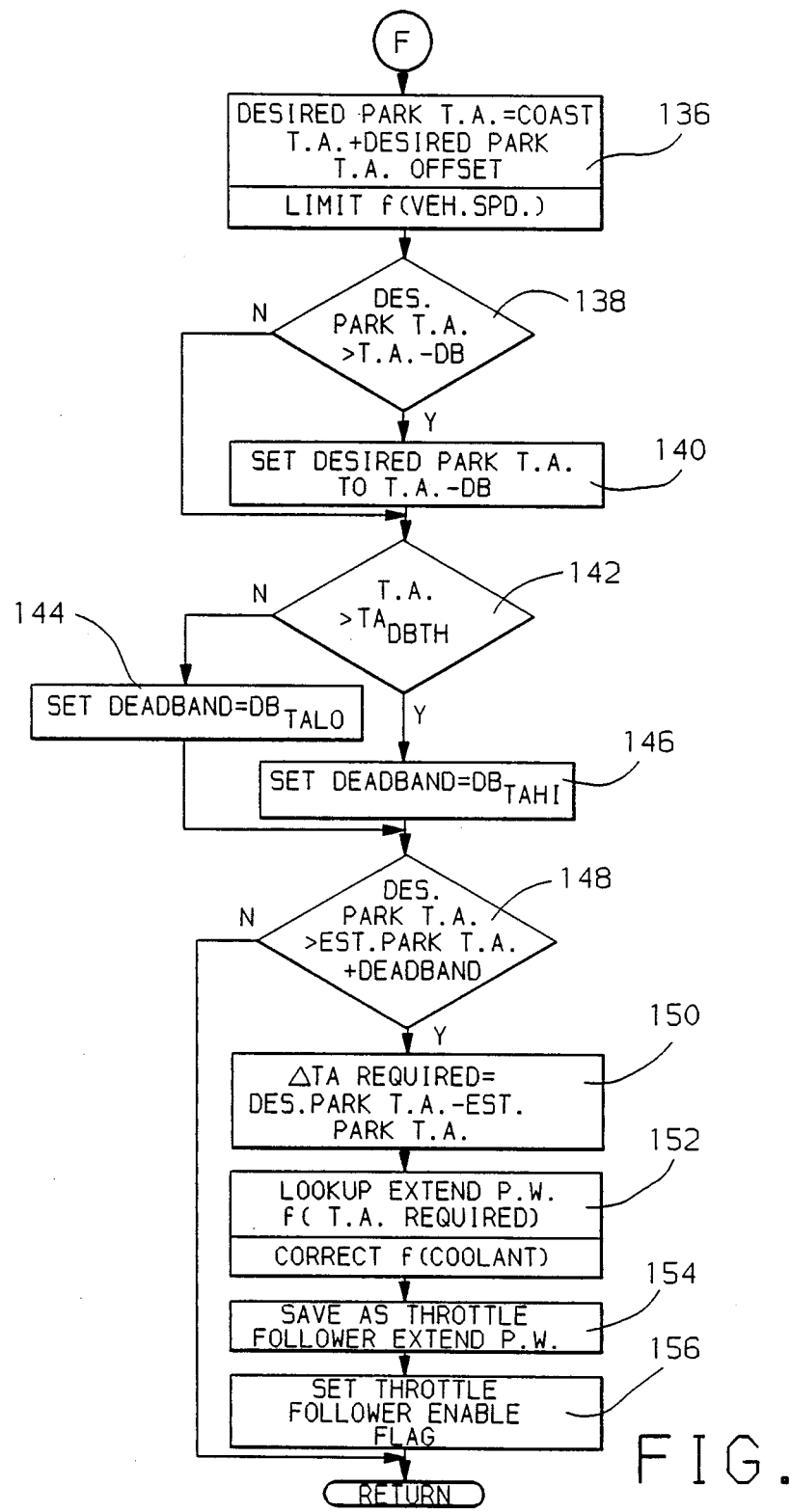

It will first be assumed that the throttle stop switch 42 is open thereby enabling the extend routine to establish the desired parked throttle angle. This routine is illustrated in FIGS. 6d and 6e. A series of instructions represented by steps 118 through 134 are first executed to determine the desired parked throttle angle offset from the predetermined coastdown throttle angle. The step 118 determines the desired parked throttle angle offset as a function of the actual throttle angle limited as a function of vehicle speed. In one embodiment, a lookup table in the ROM establishes the throttle angle offset values as a function of throttle angle at an offset value of 1.5 degrees up to 10 degrees throttle angle increasing to an offset value of 15 degrees at a throttle angle of 15 degrees. These table values are then limited to a maximum value as a function of vehicle speed. For example, the value may be limited to a maximum of 2.0 degrees up to a vehicle speed of 20 mph increasing to 16.5 degrees (and therefore imposing no limit on the offset value) at a vehicle speed of 23 mph.

The steps 120 and 122 function to limit the desired parked throttle angle offset to a value $LIM_1$ when the throttle open/brake applied flag controlled by steps 96 and 98 is set indicating a potential fault condition as previously described. Steps 124 and 126 function to limit the desired parked throttle angle offset to a value $LIM_2$ when the fourth gear has been enabled and steps 128 and 130 limit the desired parked throttle angle offset to a value $LIM_3$ when the vehicle cruise is engaged. Steps 132 and 134 function to limit the minimum value of the desired parked throttle angle offset to a value $LIM_4$ as a function of the engine coolant temperature provided by the sensor 48. The minimum limit established by step 134 may be, in one embodiment, 2.5 degrees at temperatures below $-15$ degrees F and decreasing to 2.0 degrees throttle angle a 30 degrees F.

The extend routine next computes the desired parked throttle angle at step 136 by summing the desired parked throttle angle offset determined by the steps of FIG. 6d previously described to the predetermined coastdown throttle angle. This value is limited to a maximum value as a function of vehicle speed. In one embodiment, the value is limited to 13.5 degrees up to vehicle speeds of 20 mph and limited to 10 degrees throttle angle at speeds greater than 20 mph.

As previously indicated in regard to FIG. 4a, the throttle stop 34 is allowed to be extended only to a throttle angle less than the actual throttle angle by the predetermined deadband value $DB_1$. This prevents the throttle stop 34 from being moved too close to the actual throttle position and potentially interfering with the operator established position of the throttle blade 22. This is accomplished by the instructions of steps 138 and 140 where step 138 determines if the desired parked throttle angle is greater than the actual throttle angle less the deadband value $DB_1$. If the desired parked throttle angle would result in the throttle stop 34 being moved to a position representing a throttle angle within the deadband, step 140 sets the desired parked throttle angle to the value of the actual throttle angle minus the deadband amount.

The following program steps 142 through 146 establish which of the deadband values $DB_{TALO}$ or $DB_{TAHI}$ is to be used to determine if an extend pulse is to be computed. As previously described in regard to FIG. 4a, the throttle stop 34 is extended if the desired parked throttle angle is greater than the estimated parked throttle angle by one of the two deadband amounts depending on the actual throttle angle value.

Step 144 sets the deadband at the higher value $DB_{TALO}$ when the throttle angle detected by step 142 is less than the throttle angle threshold $TA_{DBTH}$ as illustrated in FIG. 4a. Conversely, when step 142 senses a throttle angle greater than the threshold level, step 146 sets the deadband to the lower value $DB_{TAHI}$ to allow smaller than usual extend pulses to be issued to the motor 40 at the higher throttle angles.

The instruction of the next series of steps 148 through 156 computes the additional extend pulse duration required to establish the parked throttle angle at the desired parked throttle angle. Step 148 first determines if an additional extend pulse duration is required. If the estimated parked throttle angle established at step 84 is within the deadband value of the desired parked throttle angle, no further extension of the throttle stop 34 is required and the program returns to the main loop of FIG. 5. When this condition exists, the throttle stop 34 is in the predetermined position determined to establish a superior transmission upshift quality if such an upshift occurs upon throttle letup by the vehicle operator and determined to provide a smooth letup feel to the vehicle operator by eliminating the harsh drive line jerk otherwise associated with a sudden release of the throttle.

If the step 148 determines that the desired parked throttle angle has not been achieved, the program proceeds to compute an extend pulse width value for further extending the throttle stop 34. This begins at step 150 where the error between the desired and estimated parked throttle angles are determined. Based on the determined throttle angle error, step 152 retrieves the uncompensated required extend pulse width from a ROM lookup table. This pulse width is corrected as a function of coolant temperature to compensate for the varying characteristics of the motor 40 as a function of temperature.

The value of the extend pulse width determined at step 152 is saved as a throttle follower extend pulse width to be used in the estimation of the parked throttle angle at steps 82 and 84 of FIG. 6b during the next execution of the throttle follower routine. Further, the computed extend pulse width value is provided to the input/output circuit for controlling the motor 40. If an extend pulse is not being issued to the motor by the input/output circuit via the driver 45, a control pulse is provided to the driver circuit along with a signal controlling the direction of the motor 40. If a pulse is currently being issued to the motor 40 in response to a previously determined extend pulse width value, the value of the extend pulse width determined at step 154 is summed with the value presently being used. The throttle follower flag previously reset at step 88 of FIG. 6b is then set at step 156 to enable the throttle follower function.

Figure 6F:
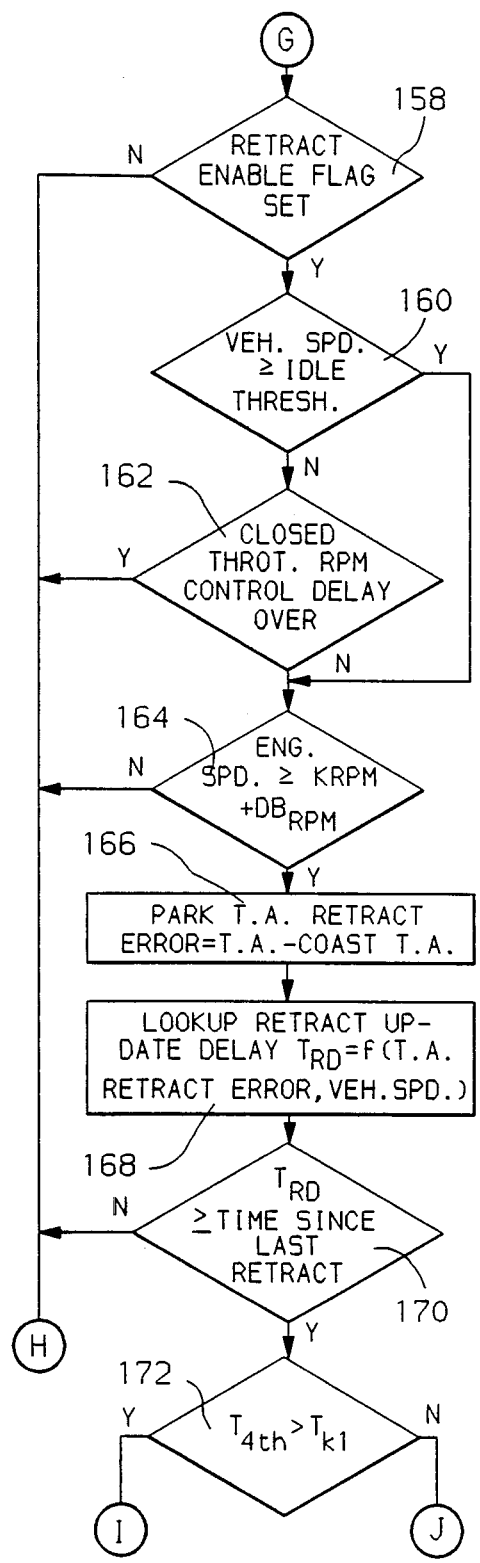
Figure 6G:
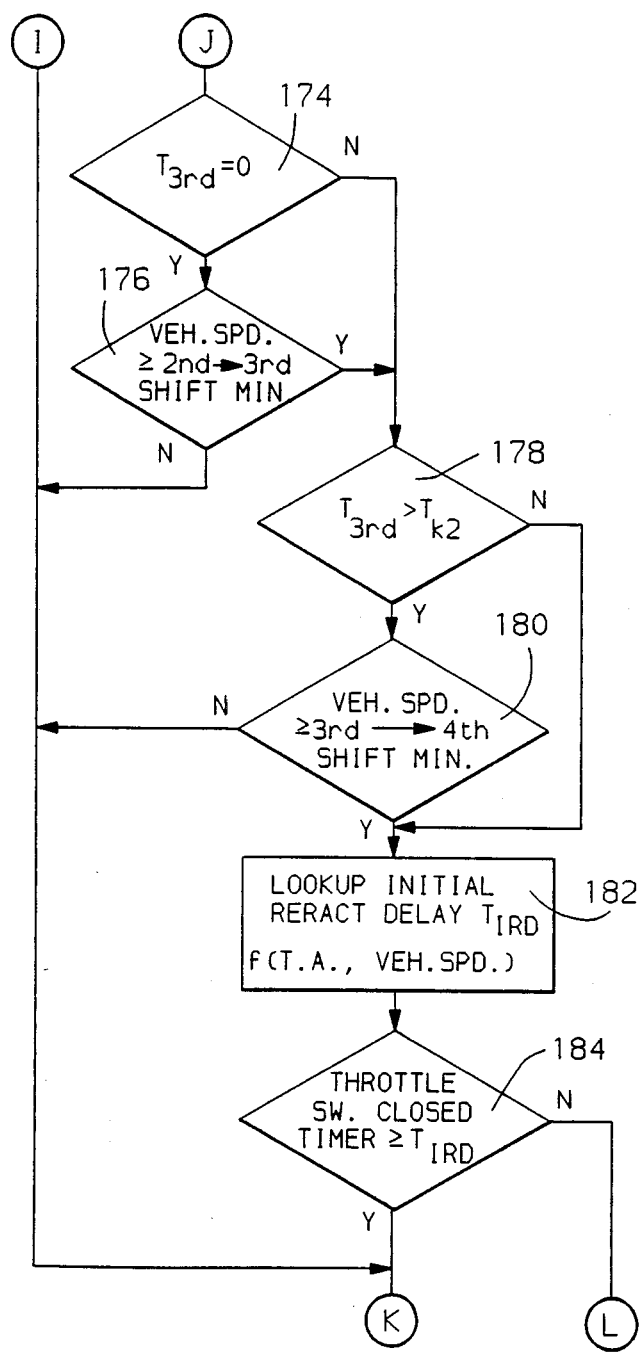
Figure 6H:
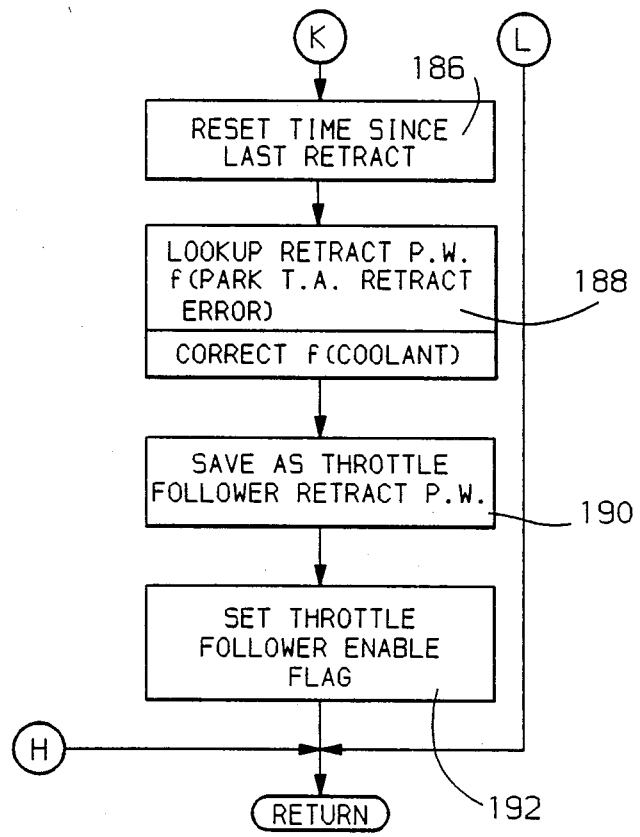

The foregoing extend pulse routine of FIGS. 6d and 6e are repeated at 12.5 millisecond intervals as long as the throttle switch 42 is open as sensed at step 116. However, when the vehicle operator releases the throttle blade 22 and the throttle lever 26 engages the throttle stop 34 to close the switch 42, a retract routine is executed to control the retraction of the throttle stop 34. This retract routine is illustrated in FIGS. 6f through 6h.

Referring to these FIGURES, controlled retraction of the throttle stop 34 begins at step 158 when step 116 senses closure of the switch 42. Step 158 senses the state of the retract enable flag as controlled by step 102 or step 112 of FIG. 6c. If the flag is cleared indicating conditions do not exist for retraction of the throttle stop 34 as a result of the actual throttle angle being within the specified deadband of the coastdown throttle angle, the system returns to the main loop of FIG. 5.

It is typical to provide a delay in the closed loop idle speed control of engine speed following release of the throttle even though the vehicle speed is otherwise within the idle speed control range. This embodiment provides for the allowance of retraction of the throttle stop 34 during this delay before closed loop idle speed control is enabled. The steps 160 and 162 implement this function by allowing the retraction until the closed loop engine speed control delay is over after which the routine proceeds from 162 and returns to the main control loop.

However, if the engine speed should drop below some predetermined value, retraction of the throttle stop via the throttle follower routine is prevented. This is to prevent potential stalls from occurring if the throttle follower were to be allowed to continue to retract the throttle stop. The step 164 provides for this function by comparing engine speed with a constant $K_{rpm}$ (such as 650 rpm) plus some deadband value $DB_{rpm}$. If the engine speed becomes less than this value, the program exits the throttle follower routine.

Assuming the engine speed condition is met, the program determines the error between the present throttle angle and the final throttle angle to be attained by the throttle follower routine which, in this embodiment, is the coastdown control throttle angle. This throttle angle error is utilized at step 168 in combination with vehicle speed to determine the required time $T_{RD}$ between retractions of the throttle stop. This delay is obtained by a lookup routine from a lookup table in ROM containing stored time delay values as a function of the throttle angle error and vehicle speed values. By the scheduling of time delays in this table, feathering down of the throttle angle to the final angle so as to avoid undesirable drive line jerk is provided while at the same time avoiding unnecessary run-on of the engine.

Step 170 determines if the required time $T_{RD}$ since the last retract has expired. It will be recalled that this elapsed time is provided by step 90 of FIG. 6b. If the time $T_{RD}$ has not expired since the last retract pulse was provided to the motor 40, the program exits the throttle follower routine and returns to the main loop.

A principal feature of this invention is the provision of the initial delay $T_{IRD}$ in the retraction of the throttle stop 34 if the automatic transmission 14 is experiencing an upshift or an upshift will occur when the vehicle operator first releases the throttle. This delay was previously described in regard to FIG. 4b.

The instructions carried out by the next series of steps 172 through 180 determine whether or not the initial retract delay $T_{IRD}$ is to be imposed by steps 182 and 184 prior to initiating the retraction of the throttle stop 34. The step 172 determines if the transmission 14 has completed its shift to its highest gear (4th gear in the present embodiment). This determination is made by comparing the time $T_{4th}$ incremented at step 71, representing the elapsed time since the upshift to 4th gear was enabled, with a value $T_{K1}$ representing the shift time. If the upshift to 4th gear is complete, no further upshifts can take place so that the initial retract delay imposed by steps 182 and 184 is bypassed.

If step 172 indicates an upshift to fourth gear has not been completed, the next step 174 determines whether or not an upshift to 3rd gear has been enabled. This is accomplished by comparing the time $T_{3rd}$ incremented at step 74 representing the elapsed time since the upshift to third gear was enabled with zero. If $T_{3rd}$ is zero indicating an upshift to third gear has not been initiated, step 176 determines if an upshift to 3rd will occur based on known vehicle speed shift points. If the vehicle speed is below the minimum speed for a 2nd to 3rd gear upshift then no released throttle upshift will occur and the initial retract delay imposed by steps 182 and 184 are bypassed. If the vehicle speed is greater than the minimum speed for a second to third gear upshift an upshift to 3rd will occur at the release of the throttle.

If step 174 represents that an upshift to third has been enabled or step 176 determines that an upshift to 3rd will occur, the next step 178 determines if the transmission 14 has completed its shift to 3rd gear. This determination is made by comparing the time $T_{3rd}$ incremented at step 74, representing the elapsed time since the upshift to 3th gear was enabled, with a value $T_{K2}$ representing the shift time. If the time has expired indicating that the vehicle has completed an upshift to third gear, the step 180 determines if an upshift to 4th will occur based on the known vehicle speed shift points. If the vehicle speed is below the minimum speed for a 3rd to 4th gear upshift then no released throttle upshift will occur and the initial retract delay imposed by steps 182 and 184 are bypassed. If the vehicle speed is greater than the minimum speed for a 3rd to 4th gear upshift, an upshift to 4th will occur at the release of the throttle.

If the steps 170 through 180 established that an upshift will occur or is in progress, the steps 182 and 184 are executed to establish the initial retraction delay $T_{IRD}$ from the time the throttle lever 26 engages the throttle stop 34 and the time at which retraction of the throttle stop 34 is allowed to close the throttle to the predetermined coastdown throttle angle. The delay established by step 182 is obtained from a lookup table as a function of vehicle speed. In another embodiment, the initial retract delay $T_{IRD}$ may be obtained from a three-dimensional lookup table as a function of the magnitude of the difference between the actual throttle angle and the desired coastdown throttle angle and vehicle speed. In any event, the delay established by step 182 is a calibration value determined to allow the transmission to stabilize following the initiation of a shift, thereby establishing, in conjunction with the parked throttle angle, the desirable released throttle upshift quality. A typical schedule of delays may provide for a relatively large delay of 1.5 seconds for vehicle speeds up to 17 mph decreasing to a lower time delay of 0.1 seconds at 24 mph. Other delay schedules may be incorporated dependent upon the powertrain characteristics and the desirable upshift quality.

The elapsed time since the throttle switch 42 was first closed is established via step 114 of FIG. 6c. This time is compared by step 184 with the delay time $T_{IRD}$ established at step 182. If the time $T_{IRD}$ has not lapsed, the program exits the throttle follower routine and returns to the main loop.

If the conditions established by the steps 158 through 184 are met for retracting the throttle stop 34 including the expiration of the time $T_{IRD}$, if required, or the expiration of the time $T_{RD}$ since the last retract pulse was provided to the motor 40, the program next executes a series of steps for controlling the motor 40 to retract the throttle stop 34. These steps begin at a step 186 where the time since the last retract is reset to again begin timing the period since the throttle stop 34 was last retracted. As previously indicated, this timing is accomplished at step 90 and utilized at steps 168 and 170 to impose the delay $T_{RD}$ between between the issuance of retract pulses to the motor 40.

The duration of the pulse required to produce desired throttle angle retraction angle is determined at step 188 as a function of the throttle angle and the retract error as established at step 166. The duration of the retract pulse is obtained from a lookup table as a function of those parameters. In general, the values stored in the lookup table in conjunction with the stored schedule of retract delay values $T_{RD}$ are predetermined to establish a desired retract schedule providing a desired smooth transition to the predetermined coastdown throttle angle. Accordingly, a series of retract pulses may be issued to the motor at intervals so as to provide an exponential decay of the throttle angle to the predetermined coastdown throttle angle. In another embodiment, a linear decay may be established by the stored schedules.

The pulse width to provide the scheduled throttle angle movement obtained from the lookup table at step 188 is corrected as a function of the engine coolant temperature to compensate for the temperature dependent operating characteristics of the DC motor 40. At step 190, the resulting pulse width value and motor retract command are saved and provided to the input-/output circuit 60 which issues a pulse to the motor 40 via the driver circuit 45 for causing retraction of the throttle stop 34. At the last step 192, the throttle follower enable flag is set to indicate functioning of the throttle follower routine. Thereafter the program exits the throttle follower routine and returns to the main loop.

The retract pulses determined as described above are periodically issued to the DC motor 40 until such time that the resulting throttle angle comes within the predetermined deadband value $DB_2$ of the coastdown throttle angle as established at steps 106 through 110. When this condition is met, the retract enable flag is reset at step 112 and the throttle retract routine is bypassed via step 158.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for controlling the transition from a power mode to a coastdown mode of a motor vehicle having an internal combustion engine with an induction passage and an angularly rotatable throttle valve member operable for controlling air flow through the induction passage into the engine, the vehicle including an automatic transmission shifted between gears in response to vehicle and engine operating conditions, the system comprising, in combination:

means for biasing the throttle valve in a valve closing direction;

a throttle stop for limiting the angular position of the throttle valve member in the closing direction to a released throttle valve angle;

means for sensing when the throttle valve member is closed to the released throttle valve angle or opened therefrom to establish the vehicle power mode;

means for sensing the angular position of the throttle valve member;

extend means responsive to the sensing of the throttle valve being opened from the released throttle valve angle for extending the throttle stop to increase the released throttle valve angle to a predetermined value, the predetermined value providing a desired quality in a transmission gear upshift occurring when the throttle valve is at the released throttle valve angle;

retract means responsive to the sensing of the throttle valve being closed to the released throttle valve angle for retracting the throttle stop to decrease the released throttle valve angle and therefore the angular position of the throttle valve member to a predetermined vehicle coastdown angle;

means for determining a transmission gear upshift condition when the throttle valve is closed to the released throttle valve angle; and means for delaying the retraction of the throttle stop by the retract means when a transmission gear upshift condition is sensed for a predetermined initial interval to allow the transmission gear upshift to complete prior to the decrease of the released throttle valve angle to the coastdown angle, whereby a desired transmission upshift quality is provided for a transmission upshift that occurs at the termination of the vehicle power mode upon the release of the throttle valve member.

2. The system of claim 1 further including means for measuring engine coolant temperature and vehicle speed and wherein the predetermined value of the released throttle valve angle is a predetermined function of the measured throttle angle, engine coolant temperature and vehicle speed.

3. The system of claim 1 including a motor for controlling the throttle stop and wherein the extend means includes (A) means for supplying pulses to the the motor for extending the throttle stop and (B) means for estimating the position of the throttle stop as a predetermined function of the duration of the pulses.

4. The system of claim 1 further including a brake switch and means for limiting the released throttle value angle to a predetermined value when the brake switch represents a brake applied state while the throttle is opened from the released throttle value angle.

5. The system of claim 1 wherein the retract means includes means for retracting the throttle stop in repeated steps separated by a predetermined retract interval to thereby provide a smooth transition of the angular position of the throttle valve member to the vehicle coastdown angle.

6. The system of claim 5 wherein the throttle stop retraction for each step is a predetermined function of the difference between the angular position of the throttle value member and the predetermined coastdown angle.

7. The system of claim 5 further including means for sensing the speed of the motor vehicle and wherein the predetermined retract interval is a predetermined function of the sensed speed of the motor vehicle and the difference between the released throttle valve angle and the vehicle coastdown angle.

8. The system of claim 7 wherein the retract means further includes means for terminating the retraction of the throttle stop when the measured angular position of the throttle valve member becomes less than the sum of the predetermined coastdown angle and a deadband value.

9. The system of claim 1 further including means for sensing the speed of the motor vehicle and wherein the initial interval is a predetermined function of vehicle speed.

10. A system for controlling the transition from a power mode to a coastdown mode of a motor vehicle having an internal combustion engine with an induction passage and an angularly rotatable throttle valve member operable for controlling air flow through the induction passage into the engine, the vehicle including an automatic transmission shifted between gears ranging from low to high gears in response to vehicle and engine operating conditions, a cruise system operable when engaged to maintain the vehicle speed and wheel brakes, the system comprising, in combination:
means for biasing the throttle valve in a valve closing direction;
a throttle stop for limiting the angular position of the throttle valve member in the closing direction to a released throttle valve angle;
means for sensing when the throttle valve member is closed to the released throttle valve angle or opened therefrom to establish the vehicle power mode;
means for sensing the angular position of the throttle valve member;
means for sensing operation of the vehicle brakes;
extend means responsive to the sensing of the throttle valve being opened from the released throttle valve angle for extending the throttle stop to increase the released throttle valve angle to a predetermined value limited to a first value when the transmission is in high gear, limited to a second value when the cruise system is engaged and limited to a third value when the vehicle brakes are operated while the throttle valve member is opened from the released throttle valve angle, the predetermined value providing a desired quality in a transmission gear upshift occurring when the throttle valve is at the released throttle valve angle;
retract means responsive to the sensing of the throttle valve being closed to the released throttle valve angle for retracting the throttle stop to decrease the released throttle valve angle and therefore the angular position of the throttle valve member to a predetermined vehicle coastdown angle;
means for determining a transmission gear upshift condition when the throttle valve is closed to the released throttle valve angle; and
means for delaying the retraction of the throttle stop by the retract means when a transmission gear upshift condition is sensed for a predetermined initial interval to allow the transmission gear upshift to complete prior to the decrease of the released throttle valve angle to the coastdown angle, whereby a desired transmission upshift quality is provided for a transmission upshift that occurs at the termination of the vehicle power mode upon the release of the throttle valve member.

11. A method for controlling the transition from a power mode to a coastdown mode of a motor vehicle having an internal combustion engine with an induction passage and an angularly rotatable throttle valve member operable for controlling air flow through the induction passage into the engine, the vehicle including an automatic transmission shifted between gears in response to vehicle and engine operating conditions, the method comprising the steps of:
biasing the throttle valve in a valve closing direction;
limiting the angular position of the throttle valve member in the closing direction to a released throttle valve angle;
sensing when the throttle valve member is closed to the released throttle valve angle or opened therefrom to establish the vehicle power mode;
sensing the angular position of the throttle valve member;
extending the throttle stop in response to the sensing of the throttle valve being opened from the released throttle valve angle to increase the released throttle valve angle to a predetermined value, the predetermined value providing a desired quality in a transmission gear upshift occurring when the throttle valve is at the released throttle valve angle;
retract means responsive to the sensing of the throttle valve being closed to the released throttle valve angle for retracting the throttle stop to decrease the released throttle valve angle and therefore the angular position of the throttle valve member to a predetermined vehicle coastdown angle;
determining a transmission gear upshift condition when the throttle valve is closed to the release throttle valve angle; and
delaying the retraction of the throttle stop by the retract means for a predetermined initial interval when a transmission gear upshift condition is sensed to allow the transmission gear upshift to complete prior to the decrease of the released throttle valve angle to the coastdown angle, thereby a desired transmission upshift quality is provided for a transmission upshift that occurs at the termination of the vehicle power mode upon the release of the throttle valve member.

* * * * *